3,390,188
PROCESSES FOR THE PRODUCTION OF γ-CHLORO-γ-ACETYLPROPANOL

Earl M. Chamberlin, Westfield, Harry L. Slates, Florham Park, and Leonard M. Weinstock, Rocky Hill, N.J., assignors to Merck & Co., Inc., Rahway, N.J., a corporation of New Jersey
No Drawing. Filed Oct. 24, 1965, Ser. No. 505,028
3 Claims. (Cl. 260—594)

ABSTRACT OF THE DISCLOSURE

Novel method for preparing γ-chloro-γ-acetylpropanol from monochloracetone and ethylene oxide. γ-Chloro-γ-acetylpropanol is a chemical intermediate useful in the synthesis of vitamin $B_1$.

---

This invention relates to a new and improved method for synthesizing thiamine, vitamin $B_1$, one of the essential vitamins.

More particularly, this invention relates to an improved method of synthesizing an intermediate in the preparation of thiamine.

Still more specifically, it relates to a method of preparing γ-chloro-γ-acetylpropanol by the base-catalyzed condensation of monochloroacetone and ethylene oxide.

The structure of vitamin $B_1$ was elucidated by R. R. Williams and coworkers more than thirty years ago and includes a pyridinium nucleus linked through a methylene substituent to a substituted thiazole ring. The structure is indicated below.

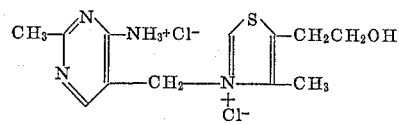

One of the early syntheses which is still utilized as the basis of a commercial method of preparing vitamin $B_1$ independently synthesizes the pyridinium fragment and the thiazole fragment of the vitamin $B_1$ molecule and subsequently combines these fragments to form the vitamin. The method of preparing the thiazole fragment involves the following sequence of reactions, beginning with the condensation of ethylene oxide and ethylacetoacetate.

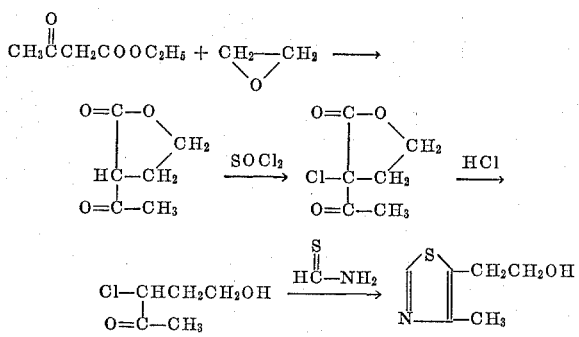

The process of the present invention utilizes relatively inexpensive starting materials, i.e., monochloroacetone and ethylene oxide, in a single-step reaction, to produce γ-acetyl-γ-chloropropanol, the intermediate utilized in the next-to-the-last step of the prior art synthesis of 5-β-hydroxyethyl-4-methylthiazole. The method of the present invention thus involves the reaction of approximately equimolar amounts of monochloroacetone and ethylene oxide under conditions that will promote enolization of the acetone molecule. The reaction is preferably carried out in the presence of an aqueous solution of a base.

Thus, the method of the present invention is conveniently carried out by mixing equimolar amounts of monochloroacetone and ethylene oxide with an aqueous solution of a catalytic amount of a base. The base selected may be an alkali or alkaline earth metal hydroxide, such as sodium hydroxide, potassium hydroxide, calcium hydroxide, barium hydroxide, and the like; an alkali or an alkaline earth metal carbonate, such as sodium, potassium or lithium carbonate, magnesium or calcium carbonate; or an alkali or an alkaline earth metal bicarbonate, such as sodium bicarbonate, potassium bicarbonate, and the like.

The reacting species, monochloroacetone and ethylene oxide, are preferably mixed in equimolar amounts in an inert liquid diluent for the reaction mixture at a temperature of about 0° or less and a small amount of an aqueous solution of a base is added thereto. The inert diluent employed is not critical to the success of the reaction but must be selected so that it reacts neither with the base employed nor with the other reacting species. Solvents which are miscible with water are preferred in order that the reaction may be carried out in a homogeneous manner. Thus, lower aliphatic alcohols such as methanol, ethanol, propanol, isopropanol, lower aliphatic ethers such as dimethyl ether, diethyl ether, diisopropyl ether and the like may be used. In addition, mixtures of these compounds with cyclic ethers such as dioxane, tetrahydrofuran, and the like, are conveniently employed. The most desirable solvent for the reaction is one which is completely inactive under the reaction conditions and which is readily removed by evaporation in vacuo following the completion of the reaction.

The reaction is ordinarily conducted at a temperature of about between −10 and +50° C. The method of conducting the reaction is to mix the ingredients at a temperature of about −10 to 0° C. and maintain it at about that temperature for approximately 30 minutes to 4 hours. Following the initial reaction period, the temperature is then raised to about 20–50° C., preferably about 25° C., for a period of from 10 to 50 hours. Following the reaction, the entire reaction mixture is extracted with a water-immiscible solvent, e.g., ether, and the extract containing the desired product is washed with water and dried and evaporated under reduced pressure to remove the solvent. The residual product is then distilled under reduced pressure to obtain substantially pure γ-chloro-γ-acetylpropanol.

The example which follows will illustrate the invention without necessarily limiting it to the specific embodiment disclosed.

EXAMPLE
3-chloro-3-acetylpropanol

A solution of 15 ml. of monochloroacetone and 10 ml. of ethylene oxide in 15 ml. of methanol at 0° is mixed with a solution of 1.0 gram of potassium carbonate in 6 ml. of water. The entire reaction mixture is stirred for approximately 4 hours at the initial temperature of 0° C. and then maintained at room temperature for a period of 48 hours with stirring. The reaction mixture is then extracted with ether and the ether extracts dried after separation from the reaction mixture. The solvent is removed from the reaction mixture by evaporation in vacuo and the residual material is distilled through a short-path distillation head to afford 3-chloro-3-acetylpropanol. B.P. 55–65° at 0.1 mm.

We claim:
1. The process which comprises intimately contacting monochloroacetone and ethylene oxide with an aqueous solution containing a catalytic amount of a base selected from the group consisting of an alkali metal hydroxide, alkaline earth metal hydroxide, alkali metal carbonate, alkaline earth metal carbonate, alkali metal bicarbonate and alkaline earth metal bicarbonate at a temperature of about −10 to +50° C. to produce γ-chloro-γ-acetylpropanol.

2. The process according to claim 1 wherein the reaction is carried out in an inert solvent medium.

3. The process according to claim 2 wherein the inert solvent employed is an aliphatic alcohol having from 1 to 5 carbon atoms.

References Cited

Gault et al., "Compt. Rend.," vol. 254, pp. 3594 to 2596 (1962).

BERNARD HELFIN, *Acting Primary Examiner.*

LEON ZITVER, *Examiner.*

M. JACOB, *Assistant Examiner.*